Feb. 14, 1956 J. A. RADO 2,735,014

KEYED OSCILLATOR

Filed Feb. 19, 1954

INVENTOR.
John A. Rado
BY J. Schmitt
H. H. Gearringer
ATTORNEYS 2,735,014

KEYED OSCILLATOR

John A. Rado, Flushing, N. Y., assignor, by mesne assignments, to the United States of America as represented by the Secretary of the Navy Application February 19, 1954, Serial No. 411,591
5 Claims. (Cl. 250—36)

Figures 1, 2:
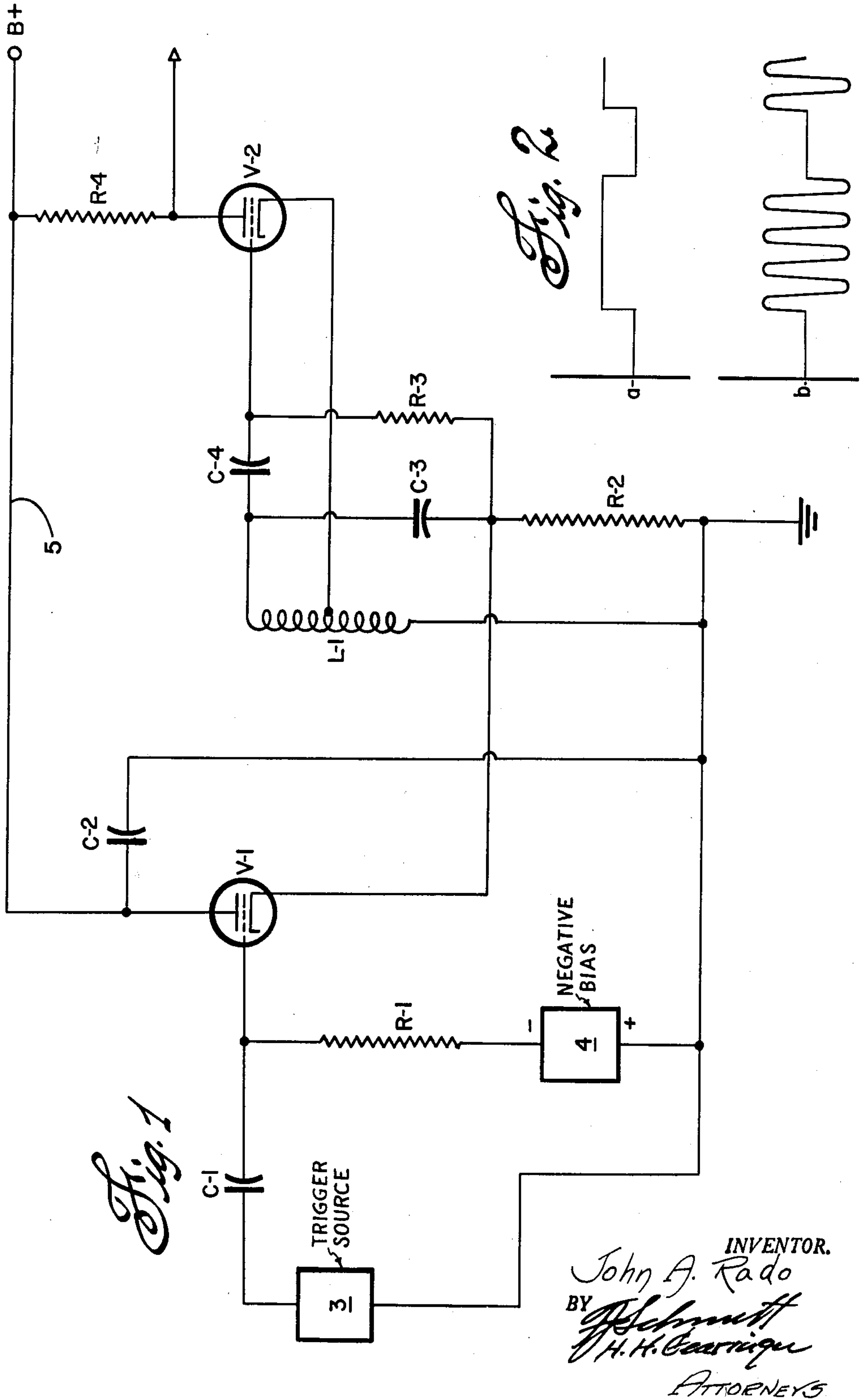

The present invention relates to a novel and improved electronic circuit and more particularly to a novel and improved electronic circuit for producing a periodically discontinuous train of oscillations.

In connection and conjunction with various types of high frequency electronic circuits and equipment, it is often necessary and desirable to produce a train of controlled electric pulses which are initiated by a suitable incoming trigger control signal and which have a periodicity that is substantially higher than the incoming trigger signal. Although a number of varied circuits have been devised in the past for this purpose, considerable difficulty has been experienced heretofore in obtaining a suitable oscillatory circuit which is sufficiently stable in operation and yet relatively incomplex in design and construction.

It is a principal object of the present invention to provide a novel and improved electronic circuit for producing a periodically discontinuous train of oscillations.

It is a further object of the present invention to provide a novel and improved keyed oscillator circuit having a particularly favorable frequency and phase stability characteristic.

Other objects and many of the attendant advantages of this invention will be readily appreciated as the same becomes better understood by reference to the following detailed description when considered in connection with the accompanying drawings wherein:

Figure 1 is a schematic circuit diagram of a preferred embodiment of the present invention.

Figures 2*a* and 2*b* respectively show typical input and output waveforms of the circuit shown in Figure 1.

In general, the improved keyed oscillator of the present invention includes a tank circuit which includes an inductive component in parallel with series capacitive and resistive components, a normally de-energized oscillator circuit which includes the said tank circuit, and means responsive to a relatively low frequency signal source for decreasing the effective magnitude of the resistive component in the tank circuit so as to permit the oscillator circuit to oscillate. It has been found that the low frequency signal source may be readily and conveniently transformed into a discontinuous train of stable high frequency oscillations in this manner.

A preferred embodiment of the present invention is shown in Figure 1 of the drawing. As illustrated therein, the trigger source 3 which is preferably adapted to provide a signal similar to that shown in Figure 2*a* is coupled to the grid of tube V–1 through condenser C–1, resistor R–1, and the negative grid biasing supply source 4. The plate circuit of tube V–1, which as will be more apparent hereinafter together with its associated circuits, forms a cathode follower circuit, extends from the positive plate voltage supply line 5, through the tube and resistor R–2 to ground. As is shown in the drawing, the plate of tube V–1 is also preferably coupled to ground through condenser C–2.

The cathode resistor R–2 of the above described cathode follower circuit is also connected as shown in series with condenser C–3 which together with the inductance element L–1 form the grid tank circuit of the oscillator tube V–2. As in a conventional Hartley oscillator circuit, the ungrounded extremity of the grid tank is coupled to the grid of tube V–2 through condenser C–4. Resistor R–3 is preferably connected as shown between the grid of tube V–2 and the junction of condenser C–3 and resistor R–2. The plate circuit of tube V–2 preferably extends from the positive plate voltage supply line 5 through resistor R–4, the tube, and the lower half of the inductance element L–1 to ground. The output circuit of the present invention is preferably coupled in any suitable conventional manner to the plate of tube V–2.

In operation, tube V–2 of the Hartley oscillator circuit is normally cut off and not oscillating due to the relatively high value of the resistive component R–2 in the grid tank circuit. Prior to the occurrence of the periodic positive gate or triggering pulse from the input source 3, the grid of the cathode follower V–1 is biased negatively by means of the supply source 4 so that tube V–1 is also normally cut off. Accordingly, the potentially low resistance path in parallel with resistor R–2 in the oscillator grid tank circuit, which path passes through tube V–1 and the condenser C–2, is effectively maintained open until a suitable trigger pulse is received at the grid of the cathode follower. However, when a trigger pulse is received, the negative bias on the grid of tube V–1 is removed and the cathode follower circuit is immediately energized. Due to the resultant change in the transconductance (GM) of tube V–1, the effective resistance component in the grid tank circuit of the oscillator is substantially reduced so as to permit the relatively high frequency Hartley oscillator to begin oscillating.

It is to be noted that at this point, the Q of the grid tank circuit which was $1/\omega CR$ prior to the occurrence of the trigger signal is substantially improved and increased to a value which is now equal to $$\frac{GM+1/R}{\omega C}$$

The high frequency oscillations which occur at the plate of tube V–2 and which are shown in Figure 2*b* of the drawing continue until the positive trigger signal at the grid of tube V–1 is removed. When this occurs, the cathode follower V–1 is immediately cut off, the effective resistive component in the grid tank circuit of the high frequency oscillator is abruptly and substantially increased and the oscillations in the oscillator circuit are rapidly and effectively dampened. Thus, it is seen that with the improved circuit of the present invention an intermittent or periodic relatively low frequency input signal source may be readily and conveniently transformed into a discontinuous train of stable relatively high frequency oscillations.

It is to be understood that although as is disclosed herein, the high frequency generating circuit preferably takes the form of a Hartley oscillator, any other conventional oscillator circuit having a tuned grid tank could be used without departing from the spirit or scope of the present invention.

Obviously many modifications and variations of the present invention are possible in the light of the above teachings. It is therefore to be understood that within the scope of the appended claims the invention may be practiced otherwise than as specifically described.

What is claimed is:

1. A keyed oscillator comprising a first triode having a control grid, an anode, and a cathode; a tank circuit having an inductive component in parallel with series capacitive and resistive components; means for grounding one extremity of the tank circuit; means for coupling the other extremity of the tank circuit to the control grid of the first triode; a resistor which is connected between the junction of the series capacitive and resistive components of the tank circuit and the control grid; means for connecting the cathode of the first triode to an intermediate portion of the inductive component of the tank circuit; a plate circuit for the first triode; a second triode having a control grid, an anode, and a cathode; means for coupling the plate of the second triode to ground; means for normally biasing the control grid of the second triode to cutoff; means for coupling the control grid of the second triode to a periodic trigger signal source; and a plate circuit for the second triode which includes the resistive component of the tank circuit as a cathode resistor.

2. A circuit comprising a normally de-energized oscillator which includes a tank circuit having an inductive component in parallel with series capacitive and resistive components; a relatively low frequency signal source; and means responsive to the signal source for decreasing the effective magnitude of the resistive component in the tank circuit so as to permit the oscillator to oscillate.

3. A circuit comprising a normally de-energized Hartley-type oscillator which includes a tank circuit having an inductive component in parallel with series capacitive and resistive components; a relatively low frequency signal source; and means responsive to the signal source for decreasing the effective magnitude of the resistive component in the tank circuit so as to permit the oscillator to oscillate.

4. Electronic apparatus comprising an oscillator which includes a tank circuit having an inductive component in parallel with series capacitive and resistive components; a normally de-energized cathode follower circuit which includes the resistive component of the tank circuit and which when energized completes a circuit which effectively shorts out the resistive component of the tank circuit; and means for controlling the energizing of the cathode follower circuit.

5. Electronic apparatus comprising a Hartley-type oscillator which includes a tank circuit having an inductive component in parallel with series capacitive and resistive components; a normally de-energized cathode follower circuit which includes the resistive component of the tank circuit and which when energized completes a circuit which effectively shorts out the resistive component of the tank circuit; and means for controlling the energizing of the cathode follower circuit.

References Cited in the file of this patent

UNITED STATES PATENTS 2,671,173 Gamertsfelder ---------- Mar. 2, 1954